US008749821B2

(12) United States Patent
Godavari et al.

(10) Patent No.: US 8,749,821 B2
(45) Date of Patent: Jun. 10, 2014

(54) PRINTING SYSTEM AND METHOD

(75) Inventors: Srinivasu Godavari, Karnataka (IN); Kapateeswaran Viswanathan, Karnataka (IN); Anjaneyulu Seetha Rama Kuchibhotla, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 350 days.

(21) Appl. No.: 12/980,338

(22) Filed: Dec. 29, 2010

(65) Prior Publication Data
US 2012/0105906 A1 May 3, 2012

(30) Foreign Application Priority Data

Oct. 28, 2010 (IN) .......................... 3227/CHE/2010

(51) Int. Cl.
*G06F 3/12* (2006.01)
*G06K 15/00* (2006.01)

(52) U.S. Cl.
USPC .......................... 358/1.15; 358/1.14; 358/1.16

(58) Field of Classification Search
USPC .......................................................... 358/1.15
See application file for complete search history.

(56) References Cited

U.S. PATENT DOCUMENTS

| 7,124,113 | B1 | 10/2006 | Fairclough et al. | |
| 7,647,278 | B1* | 1/2010 | Foth et al. | 705/59 |
| 7,746,488 | B2 | 6/2010 | Ahn | |
| 2003/0182475 | A1 | 9/2003 | Gimenez | |
| 2005/0134894 | A1 | 6/2005 | Littman et al. | |
| 2005/0268090 | A1* | 12/2005 | Saw et al. | 713/156 |
| 2006/0064580 | A1 | 3/2006 | Euchner et al. | |
| 2007/0013945 | A1* | 1/2007 | Yoshida et al. | 358/1.15 |
| 2007/0081186 | A1* | 4/2007 | Numata | 358/1.15 |
| 2008/0278751 | A1* | 11/2008 | Moyer et al. | 358/1.15 |
| 2009/0135448 | A1* | 5/2009 | Kawara | 358/1.15 |

OTHER PUBLICATIONS http://welcome.solutions.brother.com/bsc/public_s/id/secure/en/index.html.
http://www.ricohap.com/solutions/solution.aspx?SID=65.

* cited by examiner

*Primary Examiner* — Huo Long Chen

(57) ABSTRACT

Disclosed is a printing system and method for printing documents over a network. The system comprises: a document server connected to the network, the documents being accessible via the document server; a client device connected to the network and adapted to transmit a document print request identifying a document to be printed; a print access server connected to the network and adapted to receive the document print request and, in response to the received document print request, transmit a print token, the print token identifying the document to be printed and a printer for printing the document; and a printer connected to the network, the printer being adapted to receive a print token and to retrieve and print a document via the document server based on the received print token.

21 Claims, 5 Drawing Sheets

PRINTING SYSTEM AND METHOD

RELATED APPLICATION

Benefit is claimed under 35 U.S.C. 119(a)-(d) to Foreign application Serial No. 3227/CHE/2010, filed in INDIA entitled "PRINTING SYSTEM AND METHOD" by Hewlett-Packard Development Company, L.P., filed on Oct. 28, 2010, which is herein incorporated in its entirety by reference for all purposes.

BACKGROUND

It is well known to generate or design a document using a computer-based text editing or graphics package. Once generated, a document can be printed. Typically, the package or a print driver formats the document into a printer file that can be received and interpreted by a printer.

This principle typically applies to all types of printers, for example laser printers, ink jet printers, impact printers and thermal printers, and in general to other hardcopy devices such as plotters or facsimile machines. Conveniently, herein, the term "printer" covers all such different types of printers, or other hardcopy or document rendering apparatus and devices.

Also, for the sake of convenience of description herein, the term "document" will hereafter be used to denote a document in any state, including (but not limited to) when viewed on a computer display, when formatted as a printer file ready for printing, and when in hardcopy form. The state the document is in at any point in the description may depend on the context. Also, a "document" may include text, graphics or mixed representations.

Distributed computer systems make it possible for a single 'network' printer to be used by multiple users. Typically, network printers are attached to computing platforms operating as print servers within distributed systems. Alternatively, some printers, given appropriate interfaces, can be arranged to connect directly to the network of a distributed system.

Documents may, however, contain sensitive information. Remote printing of sensitive documents may therefore provide a malicious party with the ability to access such sensitive information.

BRIEF DESCRIPTION OF THE EMBODIMENTS

Embodiments are described in more detail and by way of non-limiting examples with reference to the accompanying drawings, wherein FIG. 1 depicts a usage scenario for a Secure Remote Printing system according to an embodiment;

DETAILED DESCRIPTION

Figure 1:
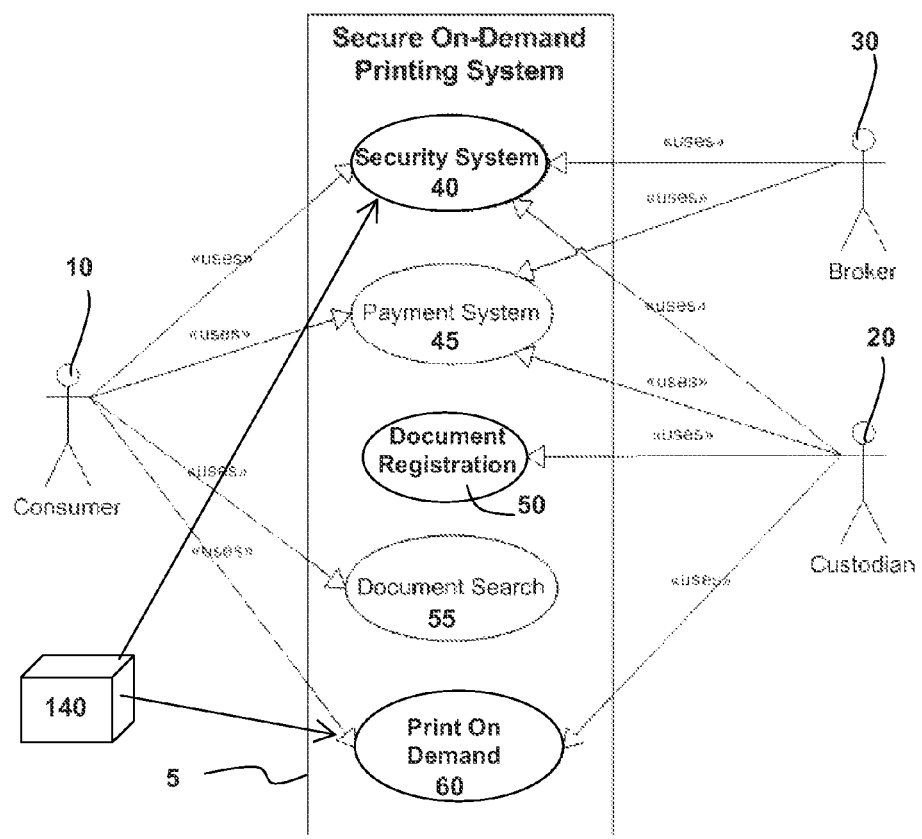

It should be understood that the Figures are merely schematic and are not drawn to scale. It should also be understood that the same reference numerals are used throughout the Figures to indicate the same or similar parts.

There is proposed a system and method for printing digital documents in a secure manner. Embodiments may therefore ensure that only a permitted consumer (i.e. a consumer who possesses the appropriate authorization) is able to print a document. Embodiments may also restrict the printing of a document to a particular, trusted printer. Thus, even where content of a document is not sensitive, printing may be controlled to ensure a document is only printed an authorized number of times (according to payments provided by a user, for example).

According to particular embodiments, a printer may be adapted to authorize the printing of a document by checking a one-time password provided by a user. Users failing to provide the necessary authorization credentials may therefore be unable to use the printer and access or read the content of a document via the printer.

According to an embodiment, there is provided a system for the distributed printing of documents over a computer network, the system comprising: a document server connected to the network, the documents being accessible via the document server; a client device connected to the network and adapted to transmit a document print request identifying a document to be printed; a print access server connected to the network and adapted to receive the document print request and, in response to the received document print request, transmit a print token, the print token identifying the document to be printed and a printer for printing the document; and a printer connected to the network, the printer being adapted to receive a print token and to retrieve and print a document via the document server based on the received print token.

The print access server may send the print token to the client device and/or the printer.

The print token may comprise a cryptographic key for controlling use of the printer identified by the print token. Also, the print access sever may be further adapted to send the cryptographic key to the document server. The document server may then encrypt the document to be printed using the cryptographic key. In one example, the authorization credentials comprise the cryptographic key. The document to be printed is encrypted using the cryptographic key.

According to another embodiment, there is provided a network printer comprising: a communication unit for establishing communication with a remote site over a network, the remote site comprising a document server via which a document to be printed is accessible; and means adapted to receive a print token, the print token comprising: information identifying the printer; information identifying the document to be printed; and print authorization information for authorizing use of the printer, wherein the printer is adapted to determine if a user is authorized to print the document based on the authorization information, and wherein the network printer is adapted to obtain and print the document from the document server based on the received print token and whether or not the user is determined to be authorized.

According to yet another embodiment, there is provided a method of printing a document over a network, the document being accessible via a document server connected to the network, the method comprising the steps of: sending, from a client device connected to the network to a print access server connected to the network, a document print request identifying the document to be printed; receiving, at the print access server, the document print request; in response to the received document print request, sending a print token, the print token identifying the document and a printer connected to the network for printing the document; receiving, at the identified printer, the print token; and, based on the received print token, obtaining the document via the document server and printing the document.

FIG. 1 depicts a usage scenario for a Secure Remote Printing (SRP) system 5 according to an embodiment. There may be three different types of users of such a system: custodian 10, consumer 20 and broker 30.

The custodian 10 controls the printing of digital documents in its custody. In a business-to-customer case, the custodian 10 would be the publisher of information such as books, magazines, newspapers, etc. In an enterprise setting, the custodian 10 would be the original creator/author of the electronic document for which printing access may need to be controlled (since it may contain information which is confidential or sensitive)

The consumer 20 prints digital documents that are accessed or retrieved. Here, a document may be printed by the custodian 10 on the consumer's printer (which is trusted by the broker and the consumer). In a business-to-customer case, the consumer 20 is the customer of the business who has subscribed to information to be printed. In an enterprise setting, the consumer 20 is the person who wishes to print a document (and is authorized by the custodian 10 to print it).

The broker 30 provides the following services:

(i) Identity management infrastructure for cryptographically identifying various custodians 10 and consumers 20;

(ii) Document and custodian discovery services for consumers 20;

(iii) Instruction services to inform custodians 10 about document access requests from consumers 20;

(iv) Payment services for consumers 20 (if document access requires payment, as in a business-to-customer case);

(v) Payment consolidation services for custodians 10 (for example, to combine all payments related to documents held by the custodians 10 in a business-to-customer case);

A broker-trusted printer 40 may be a printer which performs image processing, remote communications, and security operations. The security profile of such a printer may be customized by the broker 30 for each consumer 20 or may require a password to enable printing. Such security customization may involve the storage of consumer 20 identity information within the printer 40 (in a tamper resistant and secure manner).

The SRP system 5 of FIG. 1 is adapted to provide the following services:

(a) Security 40: Security services may include identity management services such as Public Key Infrastructure (PKI) and communication security services such as those provided by the Transport Layer Security standard. In addition to such identity management services, the system may employ one-time password services to secure interactions between the consumer 20 and the custodian 10;

(b) Payment 45: Payment services may be provided when the printing capabilities are used in a business-to-consumer (or e-commerce) setting;

(c) Registration 50: Document registration services may be provided to enable custodians to register document metadata and security settings with the SRP system;

(d) Search 55: Document search services may be adapted to enable authenticated consumers to search and identify registered documents for printing;

(e) Print on-demand 60: A print-on-demand service may allow consumers 20 and custodians 10 to establish on-the-fly security sessions without any assumption for prior peer-to-peer (consumer-to-custodian) communications. This may provide print-security guarantees which could be desired by custodians 10.

Figure 2:
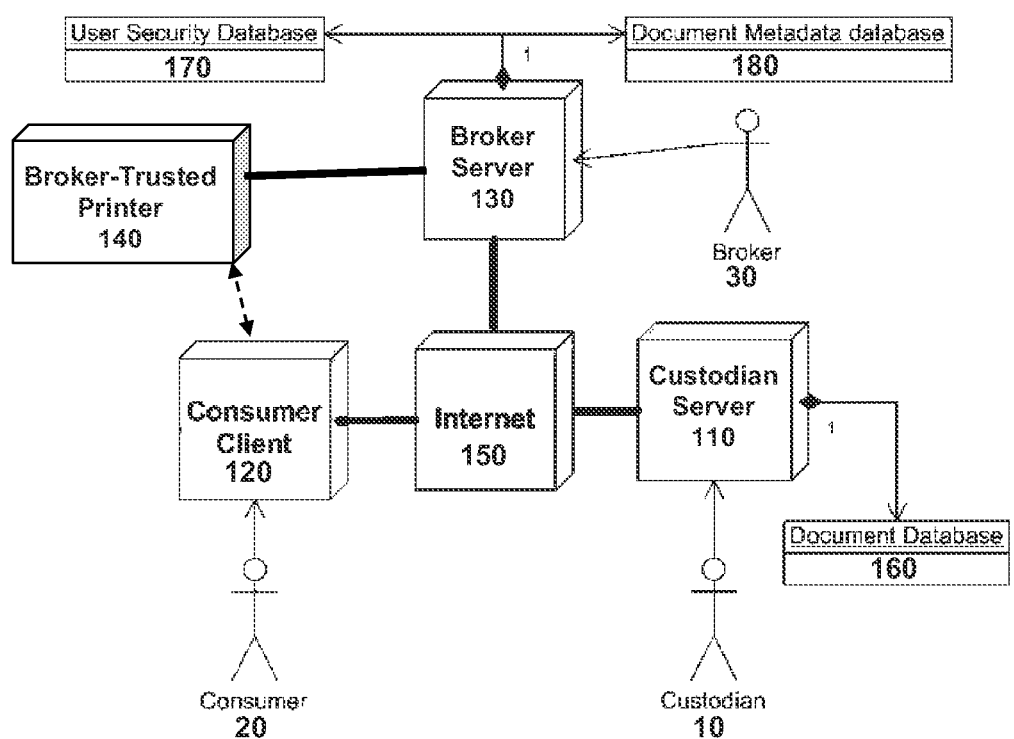
FIG. 2 depicts a block diagram of a system according to an embodiment.

FIG. 2 depicts a block diagram of a system according to an embodiment. The system comprises a consumer client 120, a custodian server 110, a broker server 130 and a printer 140. The consumer client 120, custodian server 110, broker server 130 and printer 140 are all connected to a network 150 (such as the Internet or a similar wide-area network).

The custodian server 110 is adapted to access a database 160 of digital document information. The custodian server 110 provides an interface for a custodian 10 to register document metadata and related security settings in the database 160. For example, in a business-to-customer scenario, the custodian could be a publisher of electronic content such as books or magazines, and the custodian 10 could register information about the content in the data 160 via the custodian server 110. In an enterprise case, an enterprise would be a custodian who could use the custodian server 110 to registering content that other user may print.

The broker server 130 provides a user interface for a broker 30 to register users (custodians 10 and consumers 20), their corresponding identity information (such as address and public key certificates), and access control settings for each user. In this example, the broker server 130 is adapted to access a security database 170 and a metadata database 180. The user security database 170 holds security control information that including user identity and user privilege information. The document metadata database 180 contains document security control information such as document custodian, document classification, and printing access rights and control specification.

In addition, the broker server 130 provides network services for the custodian server 110, consumer client 120, and broker-trusted printer 140. The services include security services 40, payment services 45, document registration services 50, document search services 55, and print on demand services 60.

The consumer client 120 provides an interface for a consumer 20 to make use of the system by providing authentication credentials to the system. The consumer client 120 may be adapted to enable an authenticated consumer 20 to search and identify relevant document metadata, to pay for printing a document, and to request access to document content, for example.

The broker-trusted printer 140 is adapted to be secured in a manner that means it can be trusted by the broker 30 and the broker server 130. Being trusted by the broker 30 and the broker server 130, the printer 140 can be provided to consumers by the broker 30. Here, the printer 140 is made secure by having a private key embedded in it by the broker 30 to enable confidential and tamper-resistant communications between custodians 10 and the printer 140.

Depending on the long-term (Case 1) or ephemeral (Case 2) association between the consumer 20 and broker-trusted printer 140, different types of remote document printing interactions are possible. Here, it is assumed that the consumer 20 has knowledge of a document to be printed (from using a suitable search process, for example) before such interactions can start.

Figure 3:
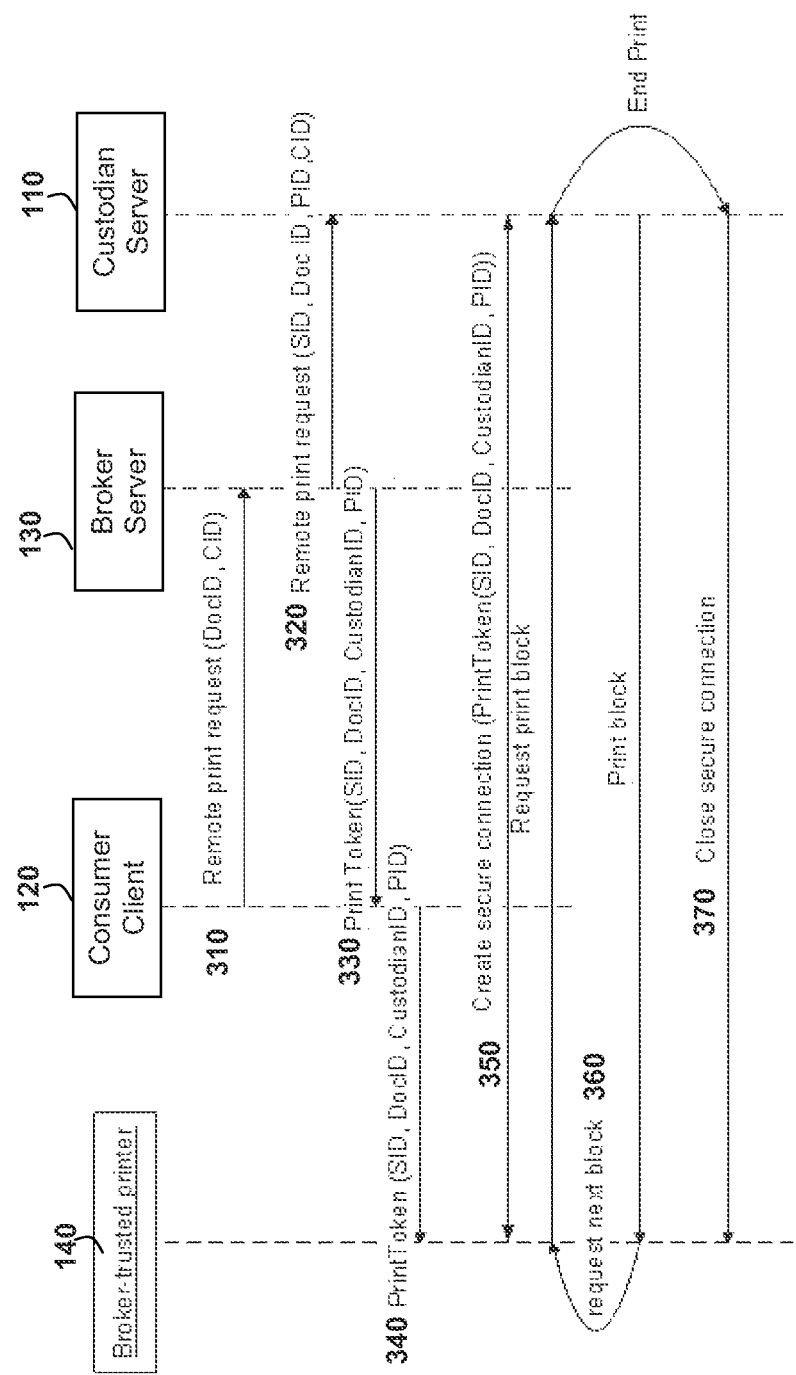
FIG. 3 depicts a remote printing interaction according to an embodiment, wherein there exists a known long-term relationship between the consumer and the broker-trusted printer.

Referring to FIG. 3, there is depicted a remote printing interaction according to an embodiment, wherein there exists a known long-term relationship between the consumer client 120 and the broker-trusted printer 140. This apriori registration allows the broker server 130 to bind the remote print requests from the consumer client 120 to prints on the related printer 140.

Firstly, in step 310 the consumer client 120 sends a remote print request to the broker server 130. The remote print request comprises the consumer's respective consumer identifier (CID) and the document identifier (DocID). In response to receiving the remote print request, the broker server 130 informs the corresponding custodian server 110 for the identified document about the remote print request by forwarding the request to the custodian along with consumer-related printer ID (PID) and a unique session identifier (SID) (Step 320).

The broker server 130 then, in step 330, sends a tamper-resistant cryptographic print token to the consumer client 120 containing the Custodian ID (CustodianID) and SID in addition to the PID and DocID. After receiving the print token, the consumer forwards the print token to broker-trusted printer 140 (with which the consumer has a long-term relationship) in step 340.

Using the print token, the broker-trusted printer 140 communicates with the custodian server 110 (identified by the CustodianID) in step 350 and establishes a secure connection between the printer 140 and the custodian 10. Using the secure connection, the document (identified by the DocID) is printed block by block in step 360 (by repeatedly requesting the next block from the custodian until all blocks have been printed). Communicating the document in blocks means the full document is not made available anywhere except the printer and the document server. In this way, unauthorized capture of the whole document may be prevented.

Once the document has been printed, the secure connection is terminated in step 370.

Figure 4:
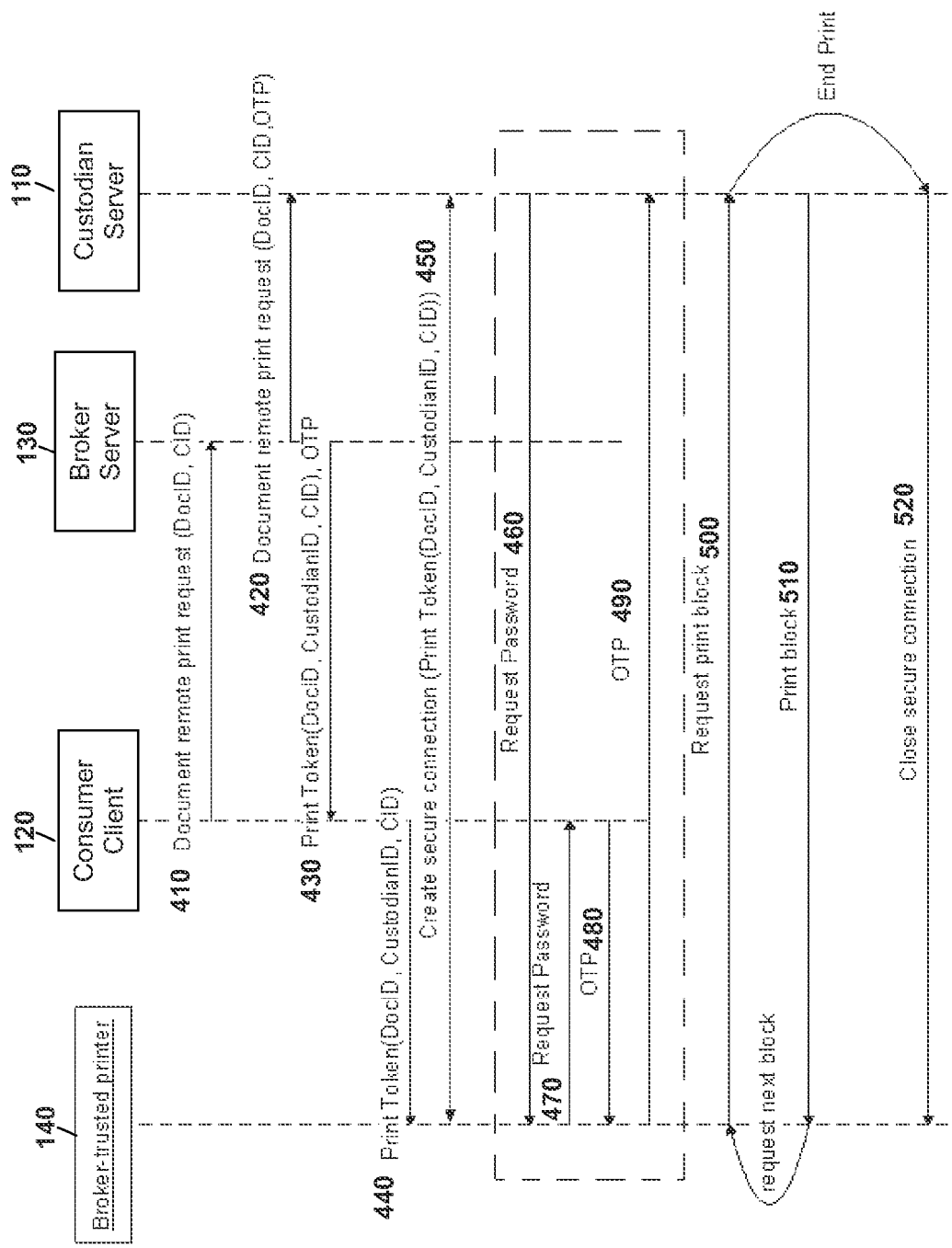
FIG. 4 depicts a remote printing interaction according to an embodiment, wherein the consumer-printer relationship is ephemeral.

Referring to FIG. 4, there is depicted a remote printing interaction according to an embodiment, wherein the consumer client (120)-printer (140) relationship is ephemeral. This differs from that of FIG. 3 (i.e. Case 1) in that that it is the consumer which identifies the printer to be used. Thus, the embodiment of FIG. 4 (Case 2) provides a late-binding feature, which may be useful in scenarios such as kiosk and enterprise printing. In order to facilitate this late binding, the broker server 130 chooses a One-Time Password (OTP) for each remote print session, which is uniquely identified by the SID.

Firstly, in step 410 the consumer client 120 sends a remote print request to the broker server 130. The remote print request comprises the consumer's respective CID and the DocID of the document to be printed. In response to receiving the remote print request, the broker server 130 informs the corresponding custodian server 110 for the identified document about the remote print request by forwarding the request to the custodian along with the OTP chosen by the broker server 130 (Step 420).

The broker server 130 then, in step 430, sends a tamper-resistant cryptographic print token to the consumer client 120 containing the Custodian ID (Custodian ID) and OTP in addition to the CID and DocID. After receiving the print token, the consumer forwards the print token (minus the OTP) to the broker-trusted printer 140 in step 440.

Using the forwarded print token, the broker-trusted printer 140 communicates with the custodian server 110 (identified by the CustodianID) in step 450 and establishes a secure connection between the broker-trusted printer 140 and the custodian server 110.

Using the secure connection, the custodian server 110 requests the OTP from the printer (Step 460), which, in turn, makes the printer request the OTP from the consumer (step 470). The consumer then provides the OTP (removed from the print token before step 460) to the broker-trusted printer 140 in step 480. The consumer-provided OTP is then sent from the broker-trusted printer 140 to the custodian server 110 using the secure connection in step 490.

The custodian server 110 then verifies the validity of the OTP for the session to confirm a secure binding between the consumer client 120 and the broker-trusted printer 140. If the OTP is valid, the document (identified by the DocID) is printed block by block and the secure connection terminated (steps 500-520).

To improve the security of the binding between the consumer client 120 and the broker-trusted printer 140, the broker server 130 may send the Print Token and the OTP through different physical communication channels such as the Internet and the mobile phone network.

Note that the difference between the embodiments of FIG. 3 and FIG. 4 is the manner in which the broker-trusted printer 140 and the consumer client 120 are authenticated by the custodian server 110. This difference may be abstracted into a single method using a decision process which checks the success of an authentication check undertaken by the broker-trusted trusted printer 140 and the success of a valid user check undertaken by the custodian server 110.

Figure 5:
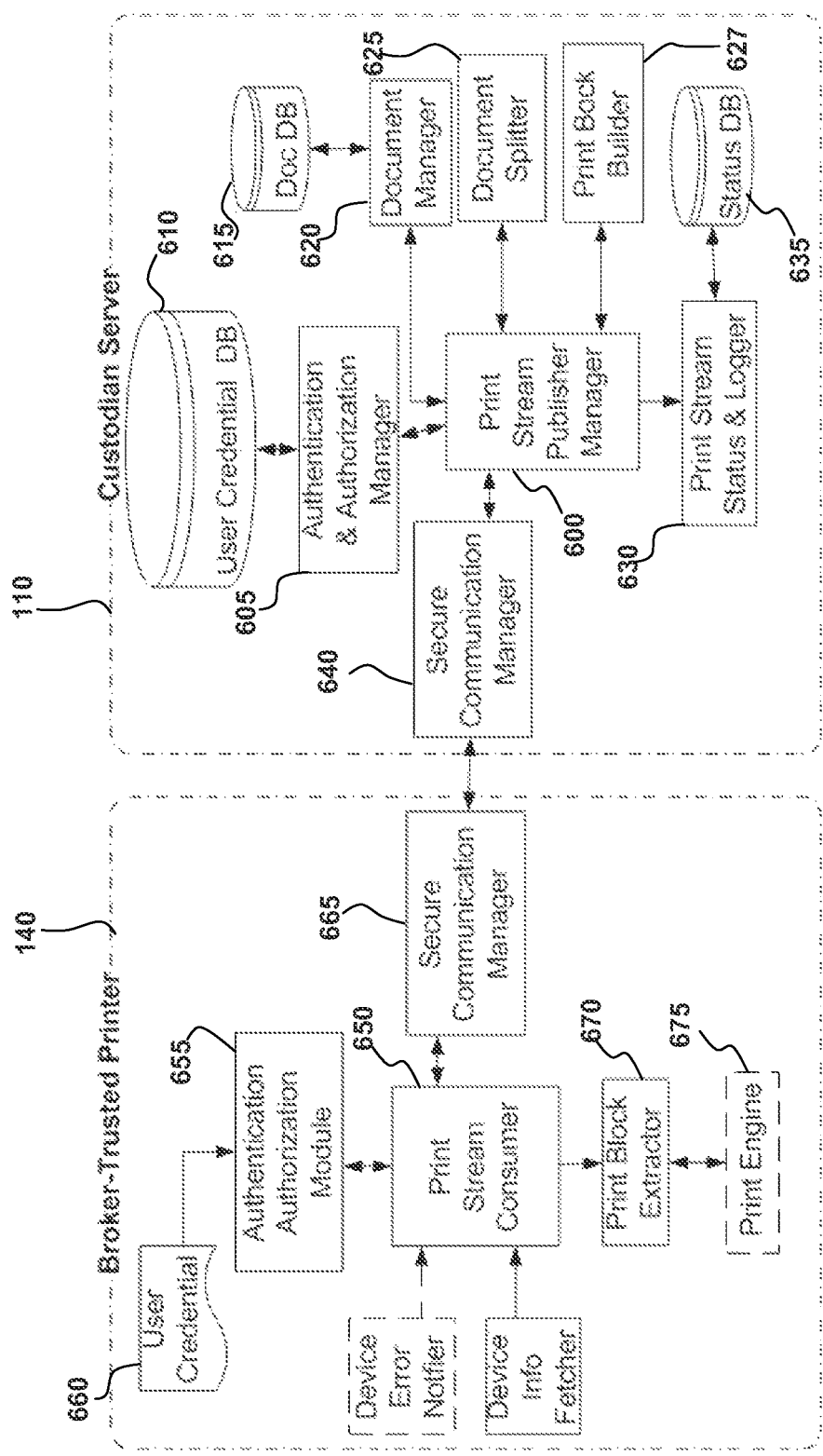
FIG. 5 is a schematic diagram of a printer and custodian server according to an embodiment.

FIG. 5 depicts a schematic diagram of a printer 140 and custodian server 110 according to an embodiment.

The Custodian Server

The custodian server 110 comprises a Print Stream Publisher Manager (PSPM) unit 600. When a new document print request is received from a user, the PSPM unit 600 checks user credentials and authorization for the document using an authentication authorization management unit 605 coupled to a database 610 of user credentials. If the credentials and authorization are confirmed, the PSPM unit 600 creates a new transaction with a session for the user.

The PSMP unit 600 retrieves the requested document from a document database 615 using a document management unit 620 and then sends the document to a Document Splitter (DS) unit 625. The DS unit 625 segregates the document into individual print blocks (a block, for example, could be a page) and adds the document owner identity to the block(s).

The PSMP unit 600 then uses a print block builder 627 to create generate a printable file for each print block. The PSPM unit 600 also then constructs a Print Message for the print block(s), which is combination of the header and the print block(s) that will be sent to the consumer client 120.

When the consumer client 120 has printed the document, the consumer client 120 sends an acknowledgement message to the custodian server 110.

The custodian server 110 comprises a Print Stream Status & Logger (PSSL) unit 630 which records all the acknowledgement messages received by the custodian server in a status database 635. If any errors occur while the document is being printed, PSPM unit 600 closes the transaction and informs the consumer client 120. For any subsequent request for the document from the user, PSPM unit 600 sends successive blocks of the last printed block. Once all the print blocks are printed at by the consumer client 120, the PSPM unit 600 updates the broker server 110.

The custodian server 110 comprises a Secure Communication Management (SCM) unit 640 which is adapted to transmit all data/messages from the custodian server 110 to the trusted printer 140 in an encrypted format.

The Trusted Printer

The trusted printer 140 comprises a Print Stream Consumer (PSC) unit 650 which interacts with other components of the printer in order to control the printing of documents.

The PSC unit 650 retrieves user identity and authorization credentials using an authentication authorization module 655 that is supplied with user credentials 660 as an input.

The PSC unit 650 transmits user identity/authorization information and document details to the custodian server 110 via a Secure Communication Management (SCM) unit 665 of the printer 140.

If the user is confirmed to be a valid user and has permission to access the document, a print message for the document is transmitted back from the custodian server 110 to the printer 140.

The print consumer request can also be based on the typing in of the one-time password on the printer.

Once the printer 140 receives the print message, a Print Block Extractor 670 extracts the appropriate print block and sends it to the print engine 675 of the printer 140 for printing.

If any errors occur while printing the print block, the PSC unit 650 captures the error(s) and sends an appropriate message as part of the acknowledgement to the custodian server 110. Otherwise, it sends a request message to the custodian sever 110 requesting the successive print block (if one or more print blocks remain).

It will be understood that embodiments provide for reliable and secure document delivery from a custodian to a consumer whilst also enabling the printing of such documents to be controlled.

Embodiments may provide one time passwords for printing to the consumer which may help authenticate a user.

Document owner identity and other related information, such as who printed the document, may be embedded in the document (either in an overt or covert way) to assist in future verification processes.

It should be noted that the above-mentioned embodiments illustrate rather than limit embodiments, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. Embodiments can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A system for the distributed printing of documents over a network, the system comprising:
   a document server connected to the network, the documents being accessible via the document server;
   a client device connected to the network and configured to transmit a document print request identifying a document to be printed;
   a print access server connected to the network and configured to receive the document print request and, in response to the received document print request, transmit a print token, the print token identifying the document to be printed, a printer for printing the document, and a custodian identifier to identify a custodian server at which the document is stored; and
   a printer connected to the network, the printer being configured to receive a print token and to retrieve and print a document via the document server based on the received print token, in which the printer determines if a user is authorized to print the document based on authorization credentials transmitted as part of the print token.

2. The system of claim 1, wherein the print token comprises a cryptographic key for controlling use of the printer identified by the print token.

3. The system of claim 2, wherein the print access sever is further configured to send the cryptographic key to the document server, and wherein the document server is configured to encrypt the document to be printed using the cryptographic key.

4. The system of claim 1, wherein the printer and document server are configured to establish a secure communication link for communicating the document to be printed from the document server to the printer.

5. A network printer comprising:
   a communication unit for establishing communication with a remote site over a network, the remote site comprising a document server via which a document to be printed is accessible; and
   an interface to receive a print token, the print token comprising:
   information identifying a printer;
   information identifying the document to be printed; and
   print authorization credentials for authorizing use of the printer, the print authorization credentials comprising a one-time password (OTP),
   wherein the printer is configured to determine if a user is authorized to print the document based on the authorization credentials, and
   wherein the network printer is configured to obtain and print the document from the document server based on the received print token and whether or not the user is determined to be authorized.

6. The printer of claim 5, wherein the authorization credentials comprise a cryptographic key and wherein the document is encrypted using the cryptographic key.

7. The printer of claim 5, wherein the print token comprises a cryptographic key for controlling use of the printer identified by the print token.

8. The printer of claim 5, wherein the printer is configured to establish a secure communication link for communicating the document to be printed from the document server to the printer.

9. The printer of claim 5, wherein the document to be printed is divided into segments at the document server, said printer being configured to retrieve and print a single segment of said document, such that said document is retrieved and printed on a segment-by-segment basis.

10. The printer of claim 5, in which the network printer controls the number of times the document is printed based on payments made by the user to a broker server.

11. The printer of claim 10, in which the number of times the document may be printed is defined by the print authorization credentials for authorizing use of the printer within the print token.

12. The printer of claim 5, in which the OTP is identified by a session identifier (SID).

13. A method of printing a document over a network, the document being accessible via a document server connected to the network, the method comprising the steps of:
   sending, from a client device connected to the network to a print access server connected to the network, a document print request identifying the document to be printed;
   receiving, at the print access server, the document print request;

in response to the received document print request, sending a print token from the print access server, the print token identifying the document a printer connected to the network for printing the document, and a custodian identifier to identify a custodian server at which the document is stored;

receiving, at the identified printer, the print token;

with the identified printer, determining if a user is authorized to print the document based on the print token; and, based on the received print token, obtaining the document via the document server and printing the document.

14. The method of claim 13, wherein the print token comprises a cryptographic key for controlling use of the printer identified by the print token.

15. The method of claim 14, further comprising:
sending the cryptographic key to the document server; and
encrypting the document using the cryptographic key.

16. The method of claim 13, further comprising establishing a secure communication link between the document server and the printer, and wherein the document is obtained using the secure communications link.

17. The method of claim 16, further comprising
receiving, at the identified printer, an authorization request for authorizing a user of the client device;
in response to the received authorization request, prompting the client device to provide authorization credentials to the identified printer;
receiving authorization credentials at the identified printer;
forwarding the received authorization credentials to the document server via the secure communication link; and
based on the authorization credentials, communicating the document to the printer via the secure communication link.

18. The method of claim 13, wherein the step of sending the print token, comprises sending the print token to the client device and the printer, and wherein the print token comprises authorization credentials for authorizing use of the printer.

19. The method of claim 13, further comprising the step of dividing the document in a plurality of document segments, and wherein the obtaining the document via the document server and printing the document comprises:
obtaining a single document segment and printing the single document segment on segment by segment basis until the plurality of document segments have been obtained and printed.

20. A print access server for communication with a printer, the printer comprising:
a communication unit for establishing communication with a remote site over a network, the remote site comprising a document server via which a document to be printed is accessible; and
an interface to receive a print token, the print token comprising:
information identifying a printer;
information identifying the document to be printed; and
print authorization credentials for authorizing use of the printer, the print authorization credentials comprising a custodian identifier to identify a custodian server at which the document is stored,
in which the printer access server receives a document print request from a client device, and, in response to the received document print request, transmits the print token to the printer,
in which the printer is configured to determine if a user is authorized to print the document based on the authorization credentials, and
in which the authorization credentials comprise a cryptographic key, the print access server encrypting the document using the cryptographic key.

21. The print access server of claim 20, in which the print access server establishes a secure connection between the printer and a custodian server based on the custodian identifier.

* * * * *

UNITED STATES PATENT AND TRADEMARK OFFICE
CERTIFICATE OF CORRECTION

| | | |
|---|---|---|
| PATENT NO. | : 8,749,821 B2 | Page 1 of 1 |
| APPLICATION NO. | : 12/980338 | |
| DATED | : June 10, 2014 | |
| INVENTOR(S) | : Srinivasu Godavari et al. | |

It is certified that error appears in the above-identified patent and that said Letters Patent is hereby corrected as shown below:

On the Title page, in Item (75), Inventors, in column 1, line 2, delete "Kapateeswaran Viswanathan" and insert -- Kapaleeswaran Viswanathan --, therefor.

IN THE CLAIMS

In column 8, line 7, in Claim 3, delete "sever" and insert -- server --, therefor.

In column 9, line 3, in Claim 13, delete "document" and insert -- document, --, therefor.

Signed and Sealed this
Twenty-sixth Day of January, 2016

Michelle K. Lee
*Director of the United States Patent and Trademark Office*